United States Patent

Derham et al.

[11] Patent Number: 4,931,187
[45] Date of Patent: Jun. 5, 1990

[54] COOLING TOWER SYSTEM

[75] Inventors: James J. Derham, Ft. Washington; Joseph M. Hannigan, North Wales; Joseph Derham, Ft. Washington, all of Pa.

[73] Assignee: Klenzoid, Inc., Conshohocken, Pa.

[21] Appl. No.: 306,950

[22] Filed: Feb. 7, 1989

[51] Int. Cl.$^5$ .................. B01D 15/04; C02F 1/58
[52] U.S. Cl. ................... 210/662; 210/687; 210/742; 210/743; 210/96.1; 210/143; 364/500
[58] Field of Search ............ 210/687, 742, 743, 745, 210/790, 96.1, 254, 696, 765, 143, 198.1, 662; 364/496, 500

[56] References Cited

U.S. PATENT DOCUMENTS

| | | | |
|---|---|---|---|
| 4,532,045 | 7/1985 | Littmann | 210/685 |
| 4,547,294 | 10/1985 | Goeldner | 210/699 |
| 4,764,271 | 8/1988 | Acosta | 210/96.1 |
| 4,830,757 | 5/1989 | Lynch et al. | 210/96.1 |

FOREIGN PATENT DOCUMENTS 55-28759  7/1980 Japan .................... 210/662

OTHER PUBLICATIONS

Kemmer, F. N., "Simplifying Cooling Tower Makeup Treatment", *ASHRAE Journal*, Jan. 1964.

*Betz Handbook of Industrial Water Conditioning*, 1976, pp. 178–181.

*Primary Examiner*—Peter Hruskoci
*Assistant Examiner*—Krisanne Shideler
*Attorney, Agent, or Firm*—Armand M. Vozzo, Jr.

[57] ABSTRACT

A cooling tower system and associated method is disclosed for controlling an aqueous coolant circulated through a cooling tower without requiring discharge of the coolant during recirculation. The coolant pumped from the cooling tower is filtered and monitored for characteristics. Generally acceptable levels of pH, temperature and TDS are maintained in the coolant to reduce the corrosive and scale-forming tendencies thereof and with those levels being maintained and monitored, the calcium content of the coolant is then adjusted in order to balance the Langelier Saturation Index (SI) at a zero level. A computer is programmed to resolve control algorithms for SI=0 and, using stored tabular data corresponding to the respective values of the monitored characteristics of pH, temperature, alkalinity and TDS, the computer calculates the value of calcium necessary to maintain a zero index. In the treatment of raw make-up water being supplied to the cooling tower system, a water softening or other like device for reducing calcium to zero is provided with a controlled by-pass for introducing raw water into the system thereby adjusting the calcium concentration in accordance with the determined zero index value.

12 Claims, 1 Drawing Sheet

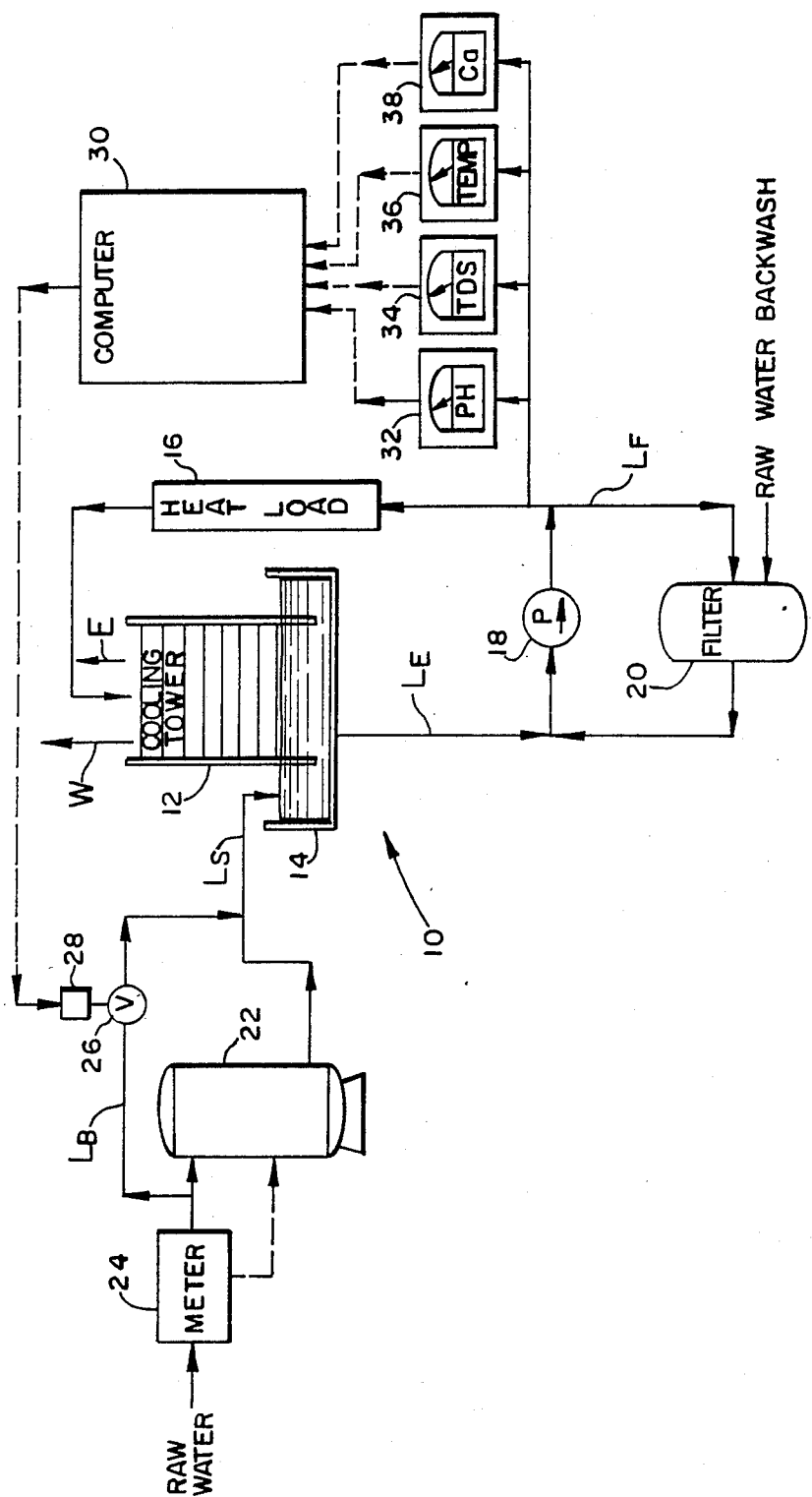

COOLING TOWER SYSTEM

BACKGROUND OF THE INVENTION

The present invention relates to heat exchange systems and more particularly to an improved cooling tower system and associated method for controlling the content and concentration of an aqueous coolant circulated within the cooling tower so that little or no discharge or "blowdown" of the coolant is required during recirculation.

In the field of heat exchange systems, particularly those associated with industry, cooling towers are widely used to remove absorbed heat from a circulating aqueous coolant by evaporating a portion of the coolant before recycling the remainder at lower temperatures for further absorption. The aqueous coolant, whose absorbed heat is drawn from the processing equipment being served, is generally comprised of water and one or more additives, such as corrosion inhibitors to protect the processing equipment, anti-fouling agents to maintain the processing equipment relatively free of scale and sludge deposits, sequestering agents to overcome calcium and iron precipitation, and biocides to prevent biological slime growths. Still another additive is acid, usually sulfuric, which is introduced as required to maintain a desired pH factor in the coolant, typically between about 7.0 and 8.0. Too low pH factor can lead to increased corrosion, whereas too high a pH, in the presence of hard water, can result in scale build-up and other harmful deposits on the heat transfer surfaces of the processing equipment.

In the cooling tower, the warmed aqueous coolant is essentially permitted to flow over a large surface, such as that provided by spaced strips of redwood or plastic, and is there subjected to a forced draft of air to bring about a partial and rapid evaporation of the thus exposed coolant. The remaining coolant, having given up heat energy to supply the heat of vaporization for the evaporated portion, flows to a reservoir from which it is pumped back to the processing equipment for the absorption of more heat, thus completing the standard cycle. As a result of this evaporation occurring within the cooling tower, the remaining coolant has a greater degree of hardness with the concentration of dissolved salts as well as in the precipitation of salts and various suspended solids found in the recirculated coolant. The increased salt concentrations and precipitates, if uncontrolled, can cause serious problems within the heat exchange system, particularly by increasing corrosion and scale build-up on the heat transfer surfaces of the processing equipment that result in inefficient heat transfer. Higher levels of suspended solids in the aqueous coolant are also capable of causing corrosion and other serious problems by forming deposits upon the heat transfer surfaces that, if not regularly cleaned, can result in reduced and frequently uneven heat transfer, poor corrosion inhibitor performance, shortened equipment life and product loss due to ineffectual cooling.

In order to overcome these problems associated with cooling tower evaporation, a procedure has been traditionally employed whereby a certain percentage of the concentrated, remaining coolant is purged from the circulating system, carrying with it a portion of the unwanted scale and deposit-forming impurities. This procedure, known as bleed-off or blowdown, is generally based on maintaining a materials balance in the system so that the scaling and fouling constituents are not sufficiently concentrated to result in harmful deposits on heat transfer surfaces. Accordingly, the blowdown is usually accompanied by a corresponding replenishment of the amount of discharged coolant by means of raw make-up water having normal concentration levels.

While this technique of blowdown has been relatively successful as a measure for controlling the degree of hardness of the aqueous coolant and for maintaining the dissolved salt and suspended solid levels thereof at acceptable levels, there are certain disadvantages associated with its practice. In the first instance, the amount of the blowdown can represent a considerable loss of water as well as a very significant loss of valuable additives. For example, in a typical, moderately sized cooling tower unit having a rate of circulation of 5,000 gallons per minute (gpm), the total quantity of blowdown over a 24-hour period can amount to 72,000 gallons or more than three times the total content of the system. This discarded water represents a very appreciable loss, both monetarily and as a valuable resource, with replenishment amounting to many thousands of dollars per year.

Apart from these economic costs associated with the loss and replenishment of the coolant, the blowdown also presents attending environmental risks due to the discharge of some very toxic additives, such as widely used chromate inhibitors. Water pollution and waste control thus become added concerns that need to be addressed in cooling tower systems relying on blowdown to control coolant levels. As a result, water treatment systems that require little or no blowdown have become most desirable for use in connection with cooling towers.

SUMMARY OF THE INVENTION

Accordingly, it is a general purpose and object of the present invention to provide an improved cooling tower system and associated method for treating the circulating aqueous coolant in order to reduce the amount of coolant discharge to virtually zero.

Another object of the present invention is to provide a treatment system for controlling the content and concentration of the aqueous coolant of a conventional cooling tower that eliminates virtually any bleed-off of the coolant and thereby reduces the costs of operation and environmental risks otherwise associated with those cooling towers.

Still another object of the present invention is to provide a zero-discharge cooling tower system capable of treating the circulating aqueous coolant, either manually or automatically, so as to minimize corrosion and scale-forming that may otherwise occur upon heat transfer surfaces of the processing equipment being cooled.

A still further object of the present invention is to provide an improved means and method for controlling the treatment of the aqueous coolant within a cooling tower system that is efficient in operation and substantially reduced in costs, and that is readily adapted to existing cooling tower systems.

Briefly, these and other objects of the present invention are accomplished by a cooling tower system and associated method for controlling an aqueous coolant circulated through a cooling tower without requiring discharge of the coolant during recirculation. The coolant pumped from the cooling tower is filtered and monitored for characteristics of pH, temperature, total dissolved solids (TDS) and calcium content. Generally acceptable levels of pH, temperature and TDS are maintained in the coolant to reduce the corrosive and scale-forming tendencies thereof and with those levels being maintained and monitored, the calcium content of the coolant is then adjusted in order to balance the Langelier Saturation Index (SI) at a zero level. A computer is programmed to resolve control algorithms for SI=0 and, using stored tabular data corresponding to the respective values of the monitored characteristics of pH, temperature, alkalinity and TDS, the computer determines the value of calcium necessary to maintain a zero index. In the treatment of raw make-up water being supplied to the cooling tower system, a water-softening or other like device for reducing calcium to zero is provided with a controlled by-pass for introducing raw water into the system thereby adjusting the calcium concentration in accordance with the determined zero index value.

For a better understanding of these and other aspects of the present invention, reference may be made to the following detailed description taken in conjunction with the accompanying drawings in which reference numerals and letters are used to designate various elements of the invention.

BRIEF DESCRIPTION OF THE DRAWING

The drawing is a schematic representation of a cooling tower system according to the present invention.

DESCRIPTION OF THE PREFERRED EMBODIMENT

Referring now to the drawing, a cooling tower system 10 is shown in which a conventional cooling tower 12 is erected atop a cooling tower sump 14 and employed to remove a certain amount of heat energy absorbed by an aqueous coolant as it is made to circulate through a heat load 16. Drawn from the cooling tower sump 14, the aqueous coolant $L_E$ is circulated by a conventional pump 18 through the heat load 16 and delivered to the top of the cooling tower 12. In accordance with conventional cooling tower operation, heat energy absorbed by the coolant $L_E$ from the heat load 16 is removed from the system 10 by the evaporative effects of the cooling tower 12. The predominant amount of heat energy typically leaves the cooling as evaporated water E with a small quantity venting the tower through windage W, typically via water droplets. To replace the amount of aqueous coolant lost to the cooling tower system 10 by such evaporation and windage, a supply of raw make-up water $L_S$ is delivered to the cooling tower sump 14 in a manner described below in greater detail.

The evaporative effect of the cooling tower 12 generally acts to concentrate the dissolved solids in the circulating aqueous coolant $L_E$. Furthermore, atmospheric debris and other particulate matter tend to be collected by the aqueous coolant $L_E$ as it washes through the tower 12. Since an increased concentration of suspended solids would have a scaling effect in recirculation of the aqueous coolant $L_E$, particularly causing the deposit of particulate matter upon heat exchanger surfaces within heat load 16, a conventional multi-media filter 20 is incorporated within the present cooling tower system 10 in order to maintain a sufficiently low level of suspended solids in the aqueous coolant, typically between 0-2 ppm. Located in by-pass line to pump 18, the filter 20 is sufficiently sized to filter the cooling tower system 10 at least five times daily and typically handles a flow $L_F$ at a rate of about 1% of the recirculating aqueous coolant $L_E$.

The raw make-up water $L_S$ used to replenish the present system 10 is supplied from a local source of raw water and is measured by means of a flow monitor 24. In addition to measuring the flow of raw water passing therethrough, the flow monitor 24 is further capable of providing electrical pulse signals for each predetermined quantity of water flow, which pulse signals may be counted by a conventional pulse-counting means and used for pacing the by-pass flow of raw make-up water $L_S$, as described below in greater detail. A water-softening device 22 of conventional design is used in the present system 10 and is coupled to receive a major portion of the raw water as it passes through the flow monitor 24. The water softening device 22 generally acts to reduce the hardness quality to zero and more specifically, the calcium and magnesium contents of the raw water supply before entry into the recirculating coolant flow $L_E$ of the present cooling tower system 10. Typical functions performed by the water softening device 22 may include demineralizing, chloride dealkalizing and electropurifying.

In accordance with the present invention, untreated raw water is fed through a by-pass flow $L_B$ around the water softening device 22, and the flow thereof adjusted by a valve 26 operating under the control of a solenoid 28 to regulate the calcium level of the make-up water $L_S$ entering the system 10. As set forth below in greater detail, a computer 30 or other similar electronic means for performing continuous and high speed calculations is programmed to determine an appropriate level of calcium content for the recirculating aqueous coolant $L_E$ based on a balanced Langelier Saturation Index. Having determined the proper calcium level, the computer 30 signals the solenoid 28 which, in turn, controls valve 26 to correspondingly adjust the by-pass flow $L_B$. This adjusted by-pass flow $L_B$ is then combined with the treated raw water passing through water softening device 22 to provide the system 10 with the desired supply of raw make-up water $L_S$ fed to cooling tower sump 14 for circulation.

The regulation of the by-pass flow LB of untreated raw water allowed to enter the present system 10 as part of the make-up water supply $L_S$ is governed by a balancing of the Langelier Saturation Index (SI) of the recirculating coolant $L_E$, as determined and directed by computer 30. This Langelier Saturation Index is a known and accepted indicator of the tendency of an aqueous liquid to be scale-forming or corrosive, with a positive SI indicating scale-forming tendencies and a negative SI indicating a corrosive character. A balanced Langelier Index or SI=0 is therefore evidence that the aqueous liquid is in chemical balance.

The basic equations for determining the Langelier Saturation Index and control algorithms for directing the operation of computer 30 are as follows:

(1) $SI = pH - pH_s$ where pH=actual pH factor of the aqueous liquid and $pH_s$=pH factor of the aqueous liquid at $CaCO_3$ saturation, and (2) $pH_s = (9.30 + A + B) - (C + D)$ where A=numerical valve indicator of total dissolved solids (TDS) present in the aqueous liquid in ppm;

B = numerical value indicator of temperature of the aqueous liquid in °F;

C = numerical value indicator of calcium level of the aqueous liquid in ppm of $CaCO_3$; and D = numerical value indicator of alkalinity of the aqueous liquid in ppm of $CaCO_3$.

All values of A, B, C and D are readily available from known tabular data compiled for each respective indicator and, for the present system 10, are capable of being stored in the memory of computer 30.

As an example of the use of the Langelier Index pertinent to the present invention, the following tabulates characteristic features of a typical raw water as it would be initially supplied to the present system 10 and again after water softening treatment. Thirdly, those characteristic features are further tabulated for the softened and recirculated aqueous coolant ($L_E$) having a pH adjustment and appropriate calcium addition. The parenthetical information given in the table represents the associated Langelier indicator value for that characteristic as taken from the known tabulated data.

|  | Raw Water | Softened Water | Le |
|---|---|---|---|
| pH | 7.7 | 7.7 | 7.9 |
| TDS | 540 | 540 | 7000 |
| (ppm) | (A = 0.16) | (A = 0.16) | (A = 0.30) |
| Temp. | 70° F. | 70° F. | 90° F. |
|  | (B = 2.06) | (B = 2.06) | (B = 1.84) |
| Alkalinity | 220 | 220 | 80 |
| (ppm CaCO3) | (D = 2.34) | (D = 2.34) | (D = 1.90) |
| Calcium | 220 | 0 | 108 |
| (ppm CaCO3) | (C = 1.94) | (C = 0) | (C = 1.64) |

Accordingly, the corresponding Langelier Index calculations for each stage of the water within the present system 10 is as follows:

$$S.I._{raw} = 7.7 - (9.30 + 0.16 + 2.06) + (1.94 + 2.34) = +0.5$$

$$S.I._{soft} = 7.7 - (9.30 + 0.16 + 2.06) + (0.0 + 2.34) = -1.5$$

$$S.I.L_E = 7.9 - (9.30 + 0.30 + 1.84) + (1.64 + 1.90) = 0.0$$

It should be noted and understood, therefore, that the removal of raw water hardness by water softening device 22 changes the characteristic tendencies of the water from scale-forming (S.I. = +0.5) to corrosive (S.I. = −1.5). Furthermore, after recirculation and a minor pH adjustment, the addition of a certain determinable portion of calcium, in this instance 108 ppm, brings the Langelier Index to zero and strikes a balance between those adverse characteristic tendencies evident in the aqueous coolant $L_E$.

To maintain a zero Langelier Index in the recirculating aqueous coolant $L_E$ of the present system 10, those pertinent characteristics of pH, temperature, TDS, alkalinity and calcium are continually monitored with those of pH, temperature and TDS being maintained at essentially constant levels by conventional means. A pH meter/controller 32 monitors and automatically maintains the pH factor of the aqueous coolant $L_E$ typically between 7.8–8.0. In addition to regulating the suspended solids between 0–2 ppm by means of by-pass filter 20, the total dissolved solids (TDS) level of the circulating coolant flow $L_E$ is maintained at a natural constant, typically by means of the design of cooling tower 12, and that TDS level is monitored by a commercially available meter 34. The temperature of the coolant $L_E$, also maintained at an essentially constant design level of approximately 90° F., is monitored by a thermal sensing device 36 or similar means for measuring fluid temperatures. Alkalinity of the aqueous coolant $L_E$, measured in ppm $CaCO_3$, is similarly monitored within the present system 10 using a calcium measuring device 38.

The values of the monitored characteristics of pH, TDS, temperature and alkalinity are fed to computer 30. Programmed in accordance with the above-specified control algorithms and using the stored tabular data associated with the measured characteristics of the aqueous coolant $L_E$, computer 30 calculates the numerical indicator value of calcium (C) necessary to maintain a zero level Langelier Index (Sl=0) and, by conversion using the associated tabular data, determines the amount of calcium required of the system coolant to maintain it in chemical balance without either scale-forming or corrosive tendencies. The output of the computer 30 is electrically coupled to signal solenoid 28 and associated valve 26 for adjusting the by-pass flow $L_B$ of raw water around water softening device 22. Based upon the determination of the required calcium content to chemically balance the recirculating aqueous coolant $L_E$ of the system 10, the computer 30 electrically signals the solenoid 28 and controls the valve 26 to either increase or decrease the by-pass flow $L_B$ in proportion to the flow of raw water through the water softening device 22 and thereby increase or decrease respectively, the amount of calcium fed to the cooling tower system 10 via its supply of make-up water $L_S$.

Therefore, it is apparent that the present invention provides an improved cooling tower system and associated method for treating the circulating aqueous coolant in order to reduce the amount of coolant discharge to virtually zero. By means of its regulation of calcium levels in the make-up water supply, the present invention provides a system for controlling the content and concentration of the aqueous coolant of a conventional cooling tower that eliminates virtually any need for blowdown of the coolant thereby reducing the costs of operation and environmental risks otherwise associated with those cooling towers. In addition, the present cooling tower system provides a means and method of treating the circulating aqueous coolant, capable of being performed either manually or automatically, so as to minimize corrosion and scale-forming that may otherwise occur upon the heat transfer surfaces of processing equipment being cooled. Furthermore, the present invention provides an improved system for controlling the treatment of the aqueous coolant that is efficient in operation and substantially reduced in costs, and that is readily adapted to existing cooling tower systems.

Obviously, other embodiments and modifications of the present invention will readily come to those of ordinary skill in the art having the benefit of the teachings presented in the foregoing description and drawings. It is therefore to be understood that various changes in the details, materials, steps, and arrangements of parts, which have been described and illustrated to explain the nature of the invention, may be made by those skilled in the art within the principle and scope of the invention as expressed in the appended claims.

What is claimed is:

1. A system for controlling an aqueous coolant circulated through a cooling tower without requirement of bleed-off, comprising:

means for monitoring selective characteristics of the aqueous coolant including the pH, temperature, total dissolved solids, calcium content and alkalinity thereof;

computer means coupled to said monitoring means for determining a resultant value indicative of calcium content necessary in the aqueous coolant to maintain a Langelier Saturation Index therefor at a zero level based upon the monitored characteristics; and water treatment means coupled to said computer means for controlling the calcium content of the aqueous coolant necessary to maintain the zero level Langelier Saturation Index therefor by adjusting the calcium concentration of raw make-up water supplied to the cooling tower in accordance with said resultant value.

2. A system according to claim 1, wherein said water treatment means comprises:

water softening means for treating raw make-up water supplied to the cooling tower so that the calcium concentration of the raw make-up water is reduced substantially to zero; and controlled by-pass means coupled to said computer means for feeding a controlled amount of raw make-up water around said water softening means and directly to the cooling tower thereby introducing an amount of calcium to the aqueous coolant in accordance with said resultant value.

3. A system according to claim 2, wherein said controlled by-pass means comprises:

a fluid line adapted to feed the cooling tower in by-pass of said water softening means; and control valve means connected within said fluid line and coupled to said computer means for regulating the flow of raw make-up water around said water softening means in proportion to the flow of treated water therethrough.

4. A system according to claim 3, wherein said control valve means comprises:

a fluid valve installed within said fluid line; and controller means connected to said fluid valve and coupled to said computer means for adjusting flow through said valve.

5. A system according to claim 4, wherein said controller means comprises a solenoid device.

6. A system according to claim 1, further comprising:

filter means adapted to receive the circulated aqueous coolant for maintaining a sufficiently low level of suspended solids therein to reduce the scaling effect of the coolant.

7. A system according to claim 1, wherein said computer means comprises:

a programmable computer directed by control algorithms to determine the value of calcium content in the aqueous coolant necessary to maintain a zero Langelier Saturation Index based on the value of monitored characteristics thereof.

8. A method of controlling an aqueous coolant circulated through a cooling tower without requirement of bleed-off, comprising the steps of:

monitoring selective characteristics of the aqueous coolant including the pH, temperature, total dissolved solids, calcium content and alkalinity thereof;

determining a resultant value of calcium content necessary in the aqueous coolant to maintain a Langelier Saturation Index therefor at a zero level based upon the monitored characteristics; and controlling the calcium content of the aqueous coolant necessary to maintain the zero level Langelier Saturation Index therefor by adjusting the calcium concentration of raw make-up water supplied to the cooling tower in accordance with said resultant value.

9. A method according to claim 8, wherein said step of adjusting calcium concentration of raw make-up water comprises:

treating the raw make-up water supplied to the cooling tower in order to reduce the calcium thereof to substantially zero; and feeding a controlled amount of raw make-up water directly to the cooling tower in order to introduce an amount of calcium to the aqueous coolant in accordance with said resultant value.

10. A method according to claim 9, wherein said step of feeding a controlled amount of raw make-up water directly to the cooling tower comprises:

regulating a flow of raw make-up water in by-pass of the treated raw make-up water and in controlled proportion thereto.

11. A method according to claim 8, further comprising:

maintaining said selective characteristics of pH, temperature and total dissolved solids of the aqueous coolant at substantially constant levels.

12. A method according to claim 8, further comprising:

filtering the circulated aqueous coolant to maintain a sufficiently low level of suspended solids therein to reduce the scaling effect of the coolant.

* * * * *